United States Patent
Moon et al.

(10) Patent No.: US 11,492,717 B2
(45) Date of Patent: Nov. 8, 2022

(54) MANUFACTURING APPARATUS OF ELECTROLYTIC COPPER FOIL

(71) Applicant: LG Chem, Ltd., Seoul (KR)

(72) Inventors: Jaewon Moon, Daejeon (KR); Hyung Seok Han, Daejeon (KR); Hyungkyun Yu, Daejeon (KR); Ki Hoon Paeng, Daejeon (KR)

(73) Assignee: LG Energy Solution, Ltd.

( * ) Notice: Subject to any disclaimer, the term of this patent is extended or adjusted under 35 U.S.C. 154(b) by 113 days.

(21) Appl. No.: 16/619,318

(22) PCT Filed: Nov. 7, 2018

(86) PCT No.: PCT/KR2018/013468
§ 371 (c)(1),
(2) Date: Dec. 4, 2019

(87) PCT Pub. No.: WO2019/093758
PCT Pub. Date: May 16, 2019

(65) Prior Publication Data
US 2020/0095697 A1 Mar. 26, 2020

(30) Foreign Application Priority Data
Nov. 9, 2017 (KR) .................. 10-2017-0148728

(51) Int. Cl.
C25D 1/04 (2006.01)
C25D 17/12 (2006.01)

(52) U.S. Cl.
CPC ............. *C25D 1/04* (2013.01); *C25D 17/12* (2013.01)

(58) Field of Classification Search
None
See application file for complete search history.

(56) References Cited

U.S. PATENT DOCUMENTS

| 3,654,115 A | * | 4/1972 | Langlais | C25D 1/08 |
| | | | | 204/216 |
| 6,036,826 A | * | 3/2000 | Kawachi | C25D 1/04 |
| | | | | 204/213 |
| 6,942,781 B2 | | 9/2005 | Kuhn et al. | |

(Continued)

FOREIGN PATENT DOCUMENTS

| CN | 1406290 A | 3/2003 |
| CN | 106544703 A | 3/2017 |

(Continued)

OTHER PUBLICATIONS

English translation JP 2003-049292, 2003. (Year: 2003).*

(Continued)

*Primary Examiner* — Stefanie S Wittenberg
(74) *Attorney, Agent, or Firm* — Lerner, David, Littenberg, Krumholz & Mentlik, LLP

(57) ABSTRACT

An apparatus for manufacturing an electrolytic copper foil includes an electrolytic bath defining a cavity for receiving an electrolyte; an internal drum partially disposed in the cavity; an outer drum in contact with a surface of the internal drum; a counter electrode positioned in the cavity of the electrolytic bath and positioned to be spaced apart from the internal drum by a predetermined distance; and a power supply unit electrically connecting the internal drum and the counter electrode.

13 Claims, 4 Drawing Sheets

(56) References Cited

U.S. PATENT DOCUMENTS

| | | | |
|---|---|---|---|
| 7,029,558 B2 | 4/2006 | Tomonaga et al. | |
| 7,767,126 B2 | 8/2010 | Kang et al. | |
| 8,715,836 B2 | 5/2014 | Dobashi et al. | |
| 2003/0116241 A1 | 6/2003 | Tomonaga et al. | |
| 2013/0256140 A1 | 10/2013 | Kohiki | |

FOREIGN PATENT DOCUMENTS

| | | | | |
|---|---|---|---|---|
| JP | H03180482 A | | 8/1991 | |
| JP | H04103788 A | | 4/1992 | |
| JP | H108286 A | | 1/1998 | |
| JP | 2000109993 A | | 4/2000 | |
| JP | 2002184411 A | | 6/2002 | |
| JP | 2002194585 A | | 7/2002 | |
| JP | 2002270186 A | | 9/2002 | |
| JP | 2002332587 A | | 11/2002 | |
| JP | 2003049292 | * | 2/2003 | ............... C25D 1/04 |
| JP | 2004509230 A | | 3/2004 | |
| JP | 2008025025 A | | 2/2008 | |
| JP | 2009508710 A | | 3/2009 | |
| JP | 4352623 B2 | | 10/2009 | |
| JP | 2013007069 | * | 1/2013 | ............... C25D 7/06 |
| JP | 2013147755 A | | 8/2013 | |
| JP | 2013167025 A | | 8/2013 | |
| KR | 20020081690 A | | 10/2002 | |
| KR | 20080061218 | * | 7/2008 | ............... C25D 7/00 |
| KR | 20110085077 | * | 7/2011 | ............... C25D 17/12 |
| KR | 20120072716 | * | 7/2012 | ............... C25D 1/20 |
| KR | 20130092379 | * | 8/2013 | ............... C25D 1/10 |
| KR | 20130092379 A | | 8/2013 | |
| KR | 20140023955 A | | 2/2014 | |
| KR | 20140078883 A | | 6/2014 | |

OTHER PUBLICATIONS

International Search Report from Application No. PCT/KR2018/013468, dated Feb. 27, 2019, 2 pages.

Extended European Search Report including Written Opinion for Application No. 18876896.4 dated Apr. 3, 2020, pp. 1-7.

Search Report from First Office Action for Chinese Application No. 2018800410680 dated May 6, 2021; 3 pages.

* cited by examiner

MANUFACTURING APPARATUS OF ELECTROLYTIC COPPER FOIL

CROSS-REFERENCE TO RELATED APPLICATIONS

This application is a national phase entry under 35 U.S.C. § 371 of International Application No. PCT/KR2018/013468, filed Nov. 7, 2018, published in Korean, which claims priority to and the benefit of Korean Patent Application No. 10-2017-0148728 filed Nov. 9, 2017, the entire contents of all of which are incorporated herein by reference.

TECHNICAL FIELD

The present invention relates to an apparatus for manufacturing a copper foil. More particularly, the present invention relates to an apparatus for manufacturing an electrolytic copper foil.

BACKGROUND ART

A copper foil may be mainly used as a current collector of a secondary battery or a printed circuit board (PCB).

Such a copper foil has a small thickness and may be obtained by a method in which a rotating drum is immersed in an electrolyte and copper is precipitated. That is, the rotating drum is immersed in the electrolyte including a copper ion, a current is allowed to flow in a pair of electrodes, and a copper thin film precipitated on a surface of the rotating drum is separated, thereby obtaining a copper foil. In this case, the copper foil may be continuously manufactured by rotation of the rotating drum.

Meanwhile, the copper foil is generated on the surface of the rotating drum and then separated, and is affected by a surface state of the rotating drum.

That is, when there are foreign matters on the surface of the rotating drum, a shape of the foreign matter may be transferred onto the surface of the copper foil having a small thickness or grain growth of copper may be non-uniform. Therefore, one surface of the copper foil exposed to air is not in contact with the other surface of the copper foil which is separated from the surface of the rotating drum in a state in which the other surface of the copper foil is in contact with the surface of the rotating drum, thus the surfaces of the copper foil have different shapes from each other.

When the copper foil has different surface characteristics, the surfaces of the copper foil may have different glosses and an adhesive force difference may occur. In particular, when the copper foil is used as a current collector of a secondary battery, adhesion of an active material formed on the copper foil is lowered, resulting in lowering electrical characteristics of the secondary battery.

To solve these problems, as a post-processing, a surface etching method, an additional coating method, or the like is performed, but there are increases in cost and process time.

DISCLOSURE

Technical Problem

The present invention has been made in an effort to provide an apparatus for manufacturing an electrolytic copper foil capable of easily manufacturing a copper foil having various shaped surface, if necessary, without an additional post-processing.

Technical Solution

An exemplary embodiment of the present invention provides an apparatus for manufacturing an electrolytic copper foil, including: an electrolytic bath defining a cavity for receiving an electrolyte; an internal drum partially disposed in the cavity; an outer drum in contact with a surface of the internal drum; a counter electrode positioned in the cavity of the electrolytic bath and positioned to be spaced apart from the internal drum by a predetermined distance; and a power supply unit electrically connecting the internal drum and the counter electrode.

The outer drum may have a hollow tube shape and the internal drum may be inserted into the outer drum.

The outer drum may have a surface in which a plurality of protrusions are formed, the plurality of protrusion each having a predetermined shape.

A height of the protrusion may be 0.5 μm to 10 μm.

The plurality of protrusions may be arranged with a predetermined interval interposed therebetween.

The interval between the protrusions may be 5 μm to 100 μm.

A cross section of one of the protrusions cut in a direction perpendicular to the surface of the outer drum may be a polygonal shape including a triangular shape and a quadrangle shape or a curved shape including a hemispherical shape and a circular shape.

The outer drum may be formed of a conductive material.

The conductive material may be any one selected from the group consisting of a Ti-based material, a Zr-based material, a Fe-based material, a Ni-based material, a Pb-based material, a C-based material, or a Si-based material, or an alloy thereof, or a conductive polymer material.

Advantageous Effects

As in the present invention, when using the outer drum, the copper foil may be manufactured without an additional processing.

In addition, the copper foil having various surface characteristics may be easily manufactured by diversifying shapes of a roughness formed on the surface of the outer drum.

MODE FOR INVENTION

Figure 1:
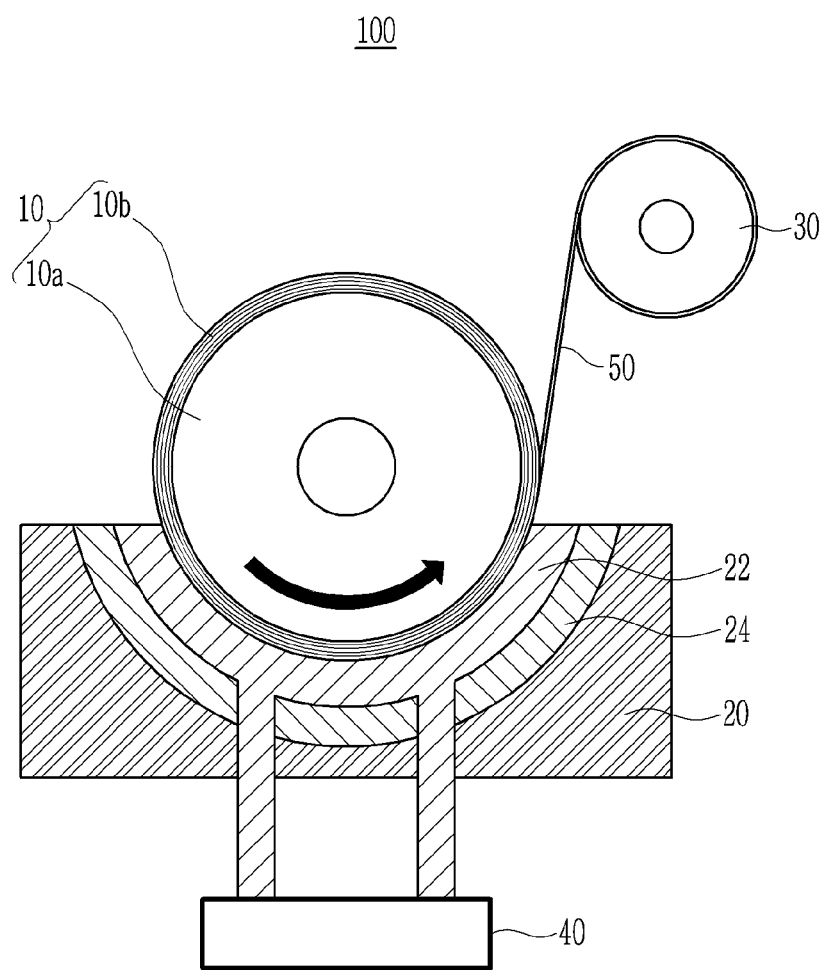
FIG. 1 is a schematic view illustrating an apparatus for manufacturing an electrolytic copper foil according to an exemplary embodiment of the present invention.

Hereinafter, embodiments of the present invention will be described in detail with reference to the accompanying drawings so that those skilled in the art may easily practice the present invention. However, the present invention may be implemented in various different forms and is not limited to exemplary embodiments described herein.

Portions unrelated to the description will be omitted to obviously describe the present disclosure, and similar portions will be denoted by similar reference numerals throughout the specification. In addition, "first", "second", "third", or the like may be used in order to avoid confusion between components.

In addition, the size and thickness of each component illustrated are randomly represented for convenience of explanation, but the present invention is not limited thereto.

Hereinafter, an apparatus for manufacturing an electrolytic copper foil according to the present invention will be described with reference to the accompanying drawings.

Figure 2:
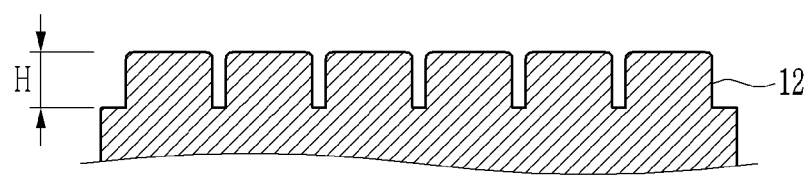
FIG. 2 is a cross-sectional view of protrusions according to an exemplary embodiment of the present invention.
Figure 2:
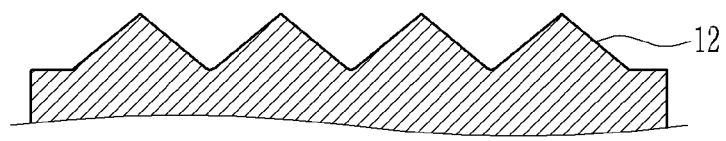
Figure 3:
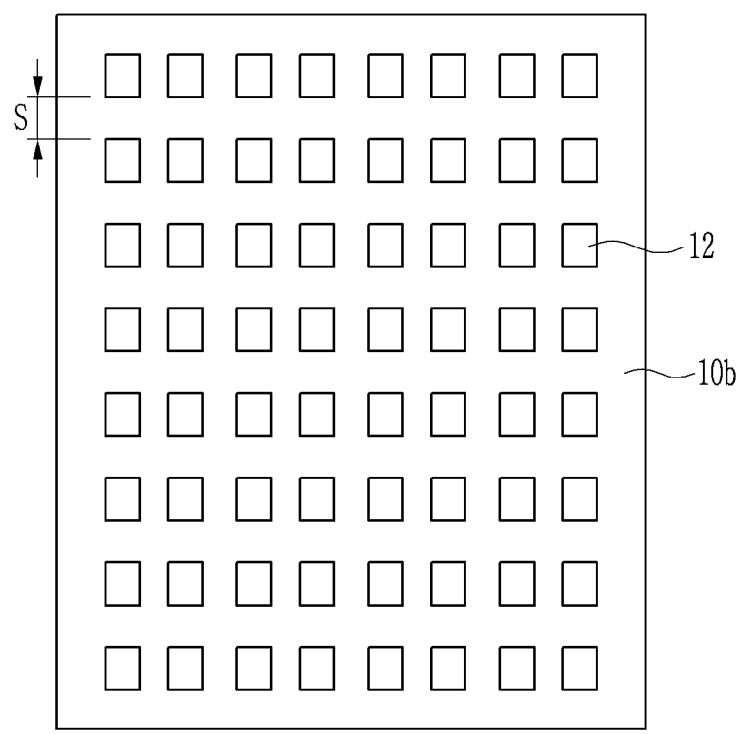
FIG. 3 is a view for describing an arrangement of protrusions according to an exemplary embodiment of the present invention.

FIG. 1 is a schematic view illustrating an apparatus for manufacturing an electrolytic copper foil according to an exemplary embodiment of the present invention, FIG. 2 is a cross-sectional view of protrusions according to an exemplary embodiment of the present invention, and FIG. 3 is a view for describing an arrangement of protrusions according to an exemplary embodiment of the present invention.

As illustrated in FIG. 1, an apparatus 100 for manufacturing an electrolytic copper foil according to an exemplary embodiment of the present invention includes an electrolytic bath 20 defining a cavity for receiving an electrolyte 22, a first rotating drum 10 partially disposed in the cavity of the electrolytic bath 20 so that the first rotating drum 10 is partially immersed in the electrolyte 22 when the electrolyte 22 is provided in the cavity, and a second rotating drum 30.

In the apparatus 100 for manufacturing an electrolytic copper foil, a metal is precipitated on a surface of an electrode in a thin film form by allowing a current to flow between two electrodes and the precipitated metal is separated from the electrode, thereby obtaining a metal thin film. The first drum 10 may be a metal, that is, an anode electrode in which copper is precipitated.

The first rotating drum 10 includes an internal drum 10a and an outer drum 10b. The outer drum 10b may have a hollow tube shape and the internal drum 10a may be inserted into the outer drum 10b. In this case, it is preferable that the internal drum 10a is inserted into the outer drum 10b so that an outer surface of the internal drum 10a is in direct contact with an internal surface of the outer drum 10b.

Accordingly, the outer drum 10b may be formed by inserting the internal drum 10a into the outer drum 10b after the outer drum 10b is separately formed or by attaching a plate shaped metal to an outer side of the internal drum 10a so as to surround the outer side of the internal drum 10a.

In this case, the outer drum 10b may surround the internal drum 10a while being closely adhered to the internal drum 10a. The outer drum 10b may have a thickness at which a roughness may be formed, for example, 1 mm to 50 mm.

Meanwhile, the outer drum 10b has one surface with a roughness pattern and the roughness pattern may be a pattern in which protrusions each have a predetermined shape and are regularly arranged.

As in FIG. 2 and FIG. 3, protrusions 12 may have a height at which a pattern is formed in a battery foil and may be arranged with an interval interposed therebetween. As an example, the protrusion 12 protruding at a height H of 0.5 μm to 10 μm from a surface of the outer drum 10b and an interval S between adjacent protrusions may be 5 μm to 100 μm.

A cross section of the protrusion 12 cut in a direction perpendicular to a surface of the outer drum may be a polygonal shape such as a triangular shape and a quadrangle shape or a curved shape such as a hemispherical shape, an oval shape, and a circular shape.

The protrusion 12 may be formed by various methods. According to a desired shape of the protrusion 12, the protrusion may be formed by selectively using methods, for example, a mechanical polishing method, a buffing method, or the like is used as a method of etching a metal, a deposition method in which non-conductive materials are disposed at a position opposite to a desired pattern on a conductive material, and a partial deposition is performed, a patterning method in which a polymer frame is filled with a metal and the polymer is burned at a high temperature to leave the metal only, and a photolithography method in which a metal thin film is applied on a precision polymer pattern and the polymer is removed to form a metal thin film pattern.

Referring to FIG. 1, since the first rotating drum 10 rotates in a state in which it is immersed in the electrolyte, as a material of the first rotating drum 10, a corrosion resistance and high strength material which is any one selected from the group consisting of a metal material such as a Ti-based material, a Zr-based material, a Fe-based material, a Ni-based material, or a Pb-based material or a non-metal material such as a C-based material or a Si-based material, or an alloy thereof, or a conductive polymer material, may be used. In this case, the internal drum 10a and the outer drum 10b may be formed of different metals, but is not limited thereto, may be formed of the same metal.

The electrolytic bath 20 receives the electrolyte 22 to form a copper foil and a counter electrode 24 may be installed in the electrolytic bath 20. The counter electrode 24 is installed to face an anode electrode and may be a cathode electrode which is a polarity opposite to the anode electrode.

The electrolyte 22 may be filled to be in contact with a lower surface of the first rotating drum 10 and it is preferable that the electrolyte completely fills the cavity, taking into account the space in the cavity already occupied by the first rotating drum 10, so that the electrolyte is filled to a height at which a contact area with the lower surface of the first rotating drum is the maximum.

The counter electrode 24 may be formed along an outer circumferential surface of the first rotating drum 10 having a circular transversal cross section and may have a hemispherical transversal cross section in a form surrounding a lower portion of the first rotating drum 10. The counter electrode 24 is positioned to be spaced apart from the first rotating drum 10 by a predetermined distance and the electrolyte 22 may flow therebetween. The electrolyte 22 may be supplied through a pump 40 installed outside and may be circulated.

The electrolyte 22 may be an electrolyte containing copper sulfate as a main component and the copper foil may be precipitated by a reaction represented by Reaction Formulas (i), (ii), and (iii).

$$CuSO_4 + 2e^- + 2H^+ \rightarrow Cu + H_2SO_4 \text{ (Reaction in rotating drum)} \quad (i)$$

$$H_2O \rightarrow 2H^+ + \tfrac{1}{2}O_2 + 2e \text{ (Reaction in counter electrode)} \quad (ii)$$

$$CuSO_4 + H_2O \rightarrow Cu + H_2SO_4 + \tfrac{1}{2}O_2 \text{ (Entire reaction)} \quad (iii)$$

A thickness of the copper foil may be changed depending on a concentration a current density, and the like of the electrolyte 22, for example, the thickness of the copper foil may be 5 μm to 100 μm.

A copper foil continuously discharged from the first rotating drum 10 is wound around the second rotating drum 30. A plurality of rolls (not illustrated) may be disposed between the first rotating drum 10 and the second rotating drum 30 so as to control a tension of the copper foil wound around the second rotating drum 30.

When the apparatus for manufacturing an electrolytic copper foil described above is used, it is possible to manufacture a copper foil 50 having a surface with a roughness.

Figure 4:
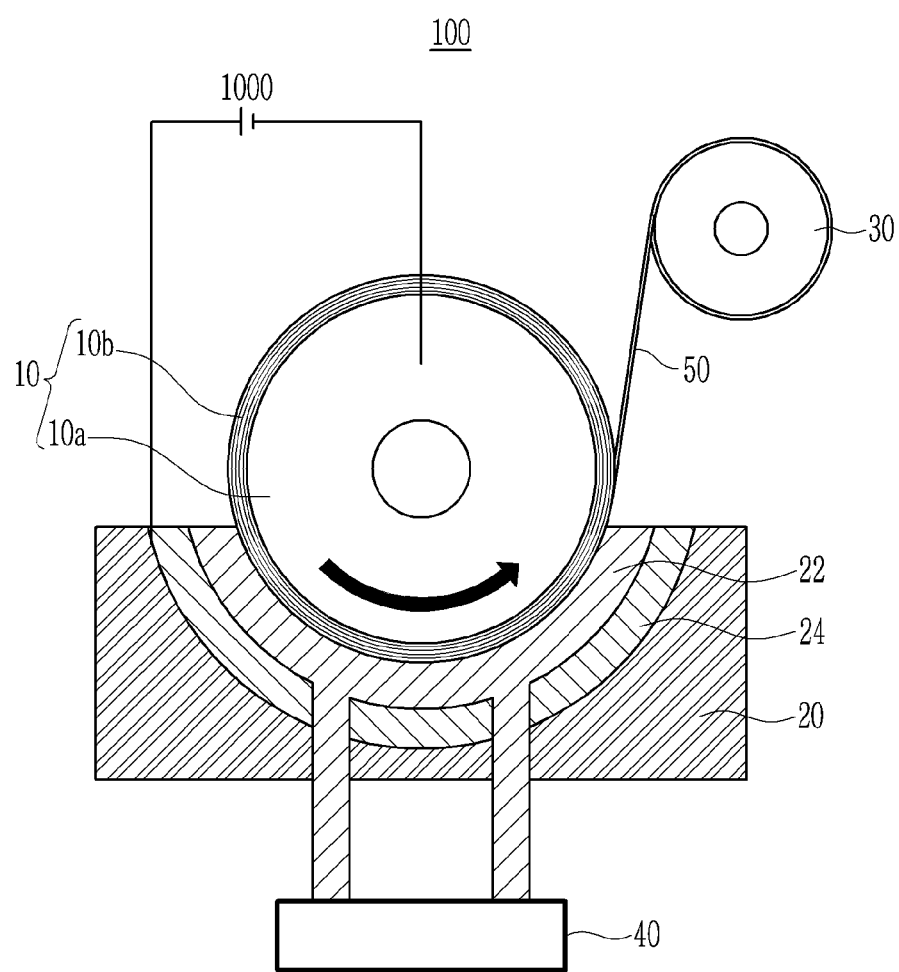
FIG. 4 is a view for describing a method of manufacturing a copper foil using the apparatus for manufacturing an electrolytic copper foil of FIG. 1.

FIG. 4 is a view for describing a method of manufacturing a copper foil using the apparatus for manufacturing an electrolytic copper foil of FIG. 1.

Referring to FIG. 4, the electrolyte 22 containing copper sulfate as a main component is filled in the electrolytic bath 20 and the first rotating drum 10 is installed so that a lower portion of the first rotating drum 10 is partially immersed in the electrolyte of the electrolytic bath 20.

In addition, when the first rotating drum 10 and the counter electrode 24 are electrically connected to each other and a current is allowed to flow therebetween through a power supply unit 1000, copper is precipitated on the surface of the first rotating drum 10 by the reaction represented by Reaction Formulas described above.

The copper is continuously precipitated during rotation of the first rotating drum 10, is formed on the surface of the first rotating drum 10 in a thin film form, and is wound around the second rotating drum 30, thereby manufacturing a copper foil roll.

As in the above-described exemplary embodiment, a specific pattern formed on the surface of the outer drum may be transferred to a surface of the copper foil by using the first rotating drum 10 including the outer drum with the specific pattern.

Since such a roughness is uniformly formed on the surface of the copper foil, it is possible to prevent a surface of a conventional drum from being non-uniform due to transfer of a polishing mark. Accordingly, there are no additional processes for treating a surface of the copper foil.

Further, the uniform roughness formed on the surface of the copper foil may prevent an adhesive force of the copper foil from being lowered due to the non-uniform surface of the copper foil.

Therefore, it is possible to easily manufacture a copper foil in view of various characteristics using an outer drum having protrusions whose arrangement and shape are deformed depending on the desired adhesiveness and gloss of a copper foil.

DESCRIPTION OF SYMBOLS

10: first rotating drum
10a: internal drum
10b: outer drum
20: electrolytic bath
30: second rotating drum
40: pump
50: copper foil

The invention claimed is:

1. An apparatus for manufacturing an electrolytic copper foil, comprising:
   an electrolytic bath defining a cavity for receiving an electrolyte;
   a rotating drum partially disposed in the cavity, wherein the rotating drum includes an outer drum formed of a single conductive material having a hollow tube shape and an internal drum formed of a single conductive material inserted into the outer drum, wherein the outer drum is an outermost drum, the internal drum is an innermost drum, and the outer drum is in direct contact with the internal drum, wherein the outer drum has a surface in which a plurality of protrusions are formed, the plurality of protrusions each having a predetermined shape;
   a counter electrode positioned in the cavity of the electrolytic bath and positioned to be spaced apart from the rotating drum by a predetermined distance; and
   a power supply unit electrically connecting the internal drum and the counter electrode.

2. The apparatus of claim 1, wherein:
a height of each protrusion of the plurality of protrusions is 0.5 μm to 10 μm.

3. The apparatus of claim 1, wherein:
the plurality of protrusions are arranged with a predetermined interval interposed therebetween.

4. The apparatus of claim 3, wherein:
the interval between the protrusions is 5 μm to 100 μm.

5. The apparatus of claim 1, wherein:
a cross section of one of the protrusions cut in a direction perpendicular to the surface of the outer drum is a polygonal shape including a triangular shape and a quadrangle shape.

6. The apparatus of claim 1, wherein:
the single conductive material of the inner drum is any one selected from the group of a Ti-based material, a Zr-based material, a Fe-based material, a Ni-based material, a Pb-based material, a C-based material, a Si-based material, an alloy of any of the foregoing materials, and a conductive polymer material, and
the single conductive material of the outer drum is any one selected from the group of a Ti-based material, a Zr-based material, a Fe-based material, a Ni-based material, a Pb-based material, a C-based material, a Si-based material, an alloy of any of the foregoing materials, and a conductive polymer material.

7. The apparatus of claim 1, wherein:
a cross section of one of the protrusions cut in a direction perpendicular to the surface of the outer drum is a curved shape including a hemispherical shape.

8. The apparatus of claim 1, wherein:
the internal drum and the outer drum are formed of different metals.

9. The apparatus of claim 1, wherein:
the internal drum and the outer drum are formed of a same metal.

10. The apparatus of claim 1, further comprising:
an electrolyte disposed in the cavity to be in contact with the outer drum.

11. The apparatus of claim 10, wherein:
the electrolyte contains copper sulfate.

12. The apparatus of claim 1, further comprising:
a pump configured to circulate the electrolyte through the cavity.

13. The apparatus of claim 1, wherein:
wherein the rotating drum is an anode electrode and the counter electrode is a cathode electrode.

* * * * *